United States Patent
Thompson et al.

(10) Patent No.: US 6,394,531 B2
(45) Date of Patent: May 28, 2002

(54) TWO PIECE CAMPER ATTACHMENT

(76) Inventors: Johnny J. E. Thompson, 1780 E. Beltline; J. Steve Kimbrel, 137 S. Holly, both of Coppell, TX (US) 75019

( * ) Notice: Subject to any disclaimer, the term of this patent is extended or adjusted under 35 U.S.C. 154(b) by 0 days.

(21) Appl. No.: 09/391,806

(22) Filed: Sep. 8, 1999

(51) Int. Cl.[7] .............................. B60P 3/39; B60R 15/00
(52) U.S. Cl. .................... 296/165; 296/160; 296/26.02; 296/26.06
(58) Field of Search ................................. 296/160, 165, 296/172, 176, 26.02, 26.06

(56) References Cited

U.S. PATENT DOCUMENTS

| | | | |
|---|---|---|---|
| 2,561,168 A | 7/1951 | Beckley | 20/2 |
| 2,811,725 A | 11/1957 | Cence | 5/119 |
| 2,917,059 A | 12/1959 | Emanuelson | 135/1 |
| 3,400,968 A * | 9/1968 | Smith | |
| 3,539,219 A | 11/1970 | Mueller | 296/23 |
| 3,575,460 A | 4/1971 | Kennedy | 296/23 |
| 3,785,693 A | 1/1974 | Fulton et al. | 296/23 R |
| 3,953,066 A | 4/1976 | Hamilton | 296/23 |
| 4,027,912 A | 6/1977 | Pacca | 296/23 |
| 4,058,133 A | 11/1977 | Barr et al. | 135/4 |
| 4,176,873 A | 12/1979 | Barr et al. | 296/153 |
| 4,522,441 A * | 6/1985 | Allison | |
| 4,653,800 A * | 3/1987 | Myers | |
| 4,973,101 A | 11/1990 | Sagstetter et al. | 296/160 |
| 5,018,778 A | 5/1991 | Goble | 296/159 |
| 6,007,137 A * | 12/1999 | Lambden | |

OTHER PUBLICATIONS

Advertisement: "WilderNest Sets Up For International Sales.", RV Business, Sep. 1989.*

* cited by examiner

Primary Examiner—Joseph D. Pape
Assistant Examiner—Scott Carpenter
(74) Attorney, Agent, or Firm—Rudolf O. Siegesmund

(57) ABSTRACT

A camper attachment comprising a top and a shell. The shell can function as a traditional camper by itself. With the top rotated open, a sleeping area between the top and the shell can be created by rotating the top upward along a common axis with the shell. Folding sections allow the sleeping area to be expanded to accommodate adults, even on short wheelbase vehicles.

5 Claims, 6 Drawing Sheets

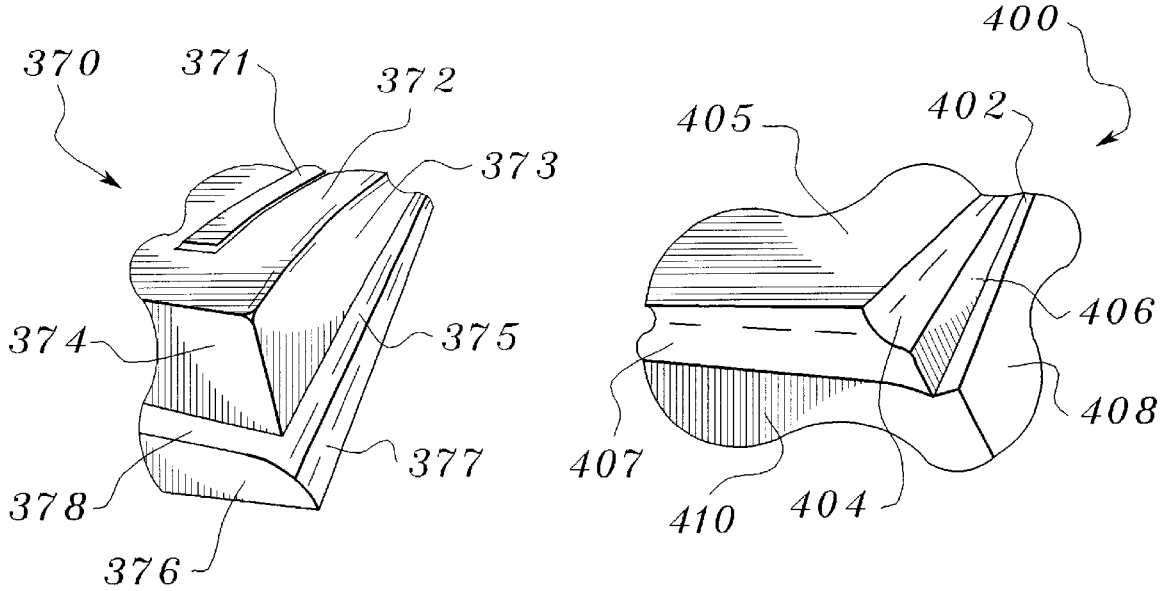
Fig. 7
Fig. 8
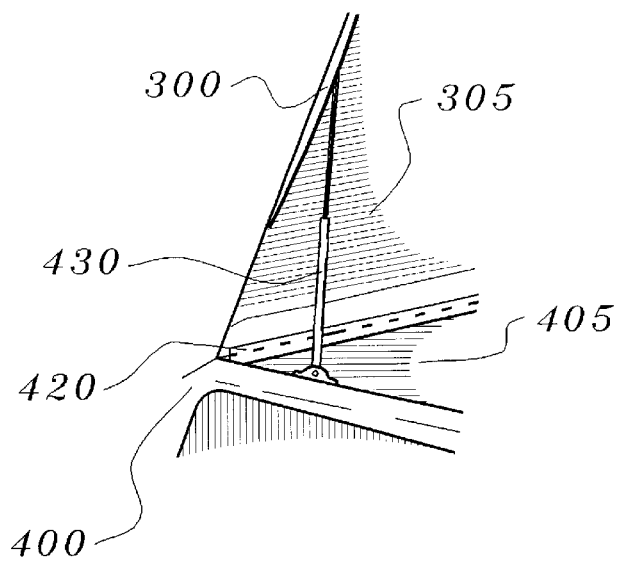
Fig. 9

TWO PIECE CAMPER ATTACHMENT

FIELD OF THE INVENTION

The present invention relates to an improved camper attachment having a top and a shell where the top is rotatably engaged to the shell. The top folds up to create an additional enclosed sleeping area with the top surface of the shell section.

BACKGROUND OF THE INVENTION

The prior art contains many examples of ways to increase the use of an automobile or truck by attaching a folding compartment to the top of the vehicle. For example, U.S. Pat. No. 2,561,168 discloses a collapsible enclosure which rests directly on the roof of the motor vehicle. U.S. Pat. No. 2,811,725 discloses a collapsible compartment using telescoping arms to raise a roof and cables for stabilizing the structure. U.S. Pat. No. 3,575,460 discloses a collapsible sleeping compartment with roof extending to create two sleeping compartments attached to the roof of the vehicle.

Camper shells for attachment to the open bed area of trucks of various sizes have become commonplace. The prior art also addresses camper shell extensions. U.S. Pat. No. 3,953,066 discloses an improved camper shell with a folding top that opens to create a sleeping area.

However, the need arises for an improved camper shell that would allow the user to create a sleeping, area for up to two people above the area enclosed by the camper shell itself without creating any opening into the camper shell. The reason that such an arrangement is desirable is that on long trips, such as a drive from the lower United States to Alaska, sleeping stops can be made without the necessity of unloading gear stowed in the enclosed bottom portion of the camper shell. Furthermore, such an improved camper shell would maintain the waterproof integrity of the storage area within the camper shell itself during extended periods of severe rain and wind as may be encountered on lengthy fishing and hunting trips to remote areas.

An additional need is for an improved camper shell that would allow an extension of the sleeping area to accommodate adults, even when attached to short wheelbase trucks.

SUMMARY OF THE INVENTION

The present invention is an improved camper top which meets the need identified above by having a camper attachment in two sections, a top and a shell. The shell can function as a traditional camper by itself With the top rotated open, a sleeping area between the top and the shell can be created by rotating the top upward along a common axis with the shell. Folding sections allow the sleeping area to be expanded to accommodate adults, even on short wheelbase vehicles.

BRIEF DESCRIPTION OF THE DRAWINGS

FIG. 7 is a detail of the roof of the two piece camper shell.

FIG. 8 is a detail of the top of the shell portion of the two piece camper top.

FIG. 9 is a detail of the hinge and lifting rod of the two piece camper shell.

DETAILED DESCRIPTION OF THE PREFERRED EMBODIMENT

Figure 1:
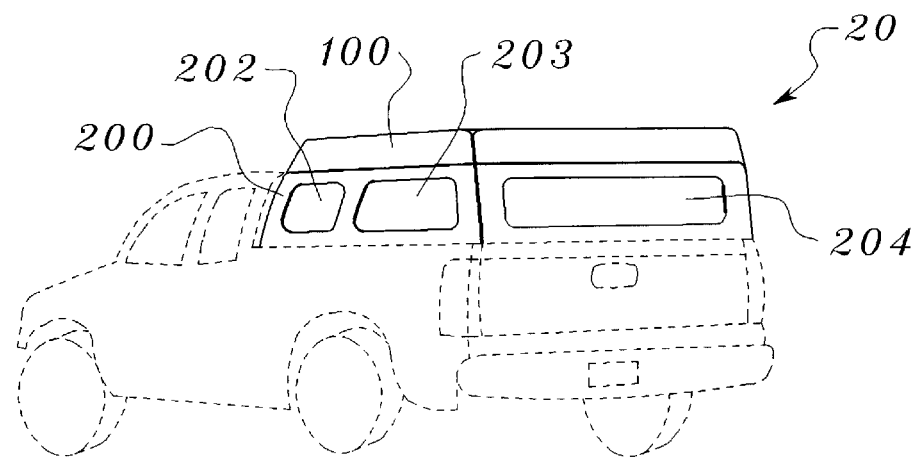
FIG. 1 shows the two piece camper shell mounted on a truck

FIG. 1 depicts a side perspective view of camper attachment 20 mounted on truck 10. Shell 200 is mounted on truck 10 and top 100 is mounted on shell 200. The appearance of camper attachment 20 when closed as shown in FIG. 1 is the same whether top 100 is mounted along a common axis at the front or at the side. Shell 200 may have windows such as front window 202, rear side window 203 and rear window 204. Shell 200 is approximately as high as the cab of truck 10 and top 100 extends above the cab of truck 10.

Figure 2:
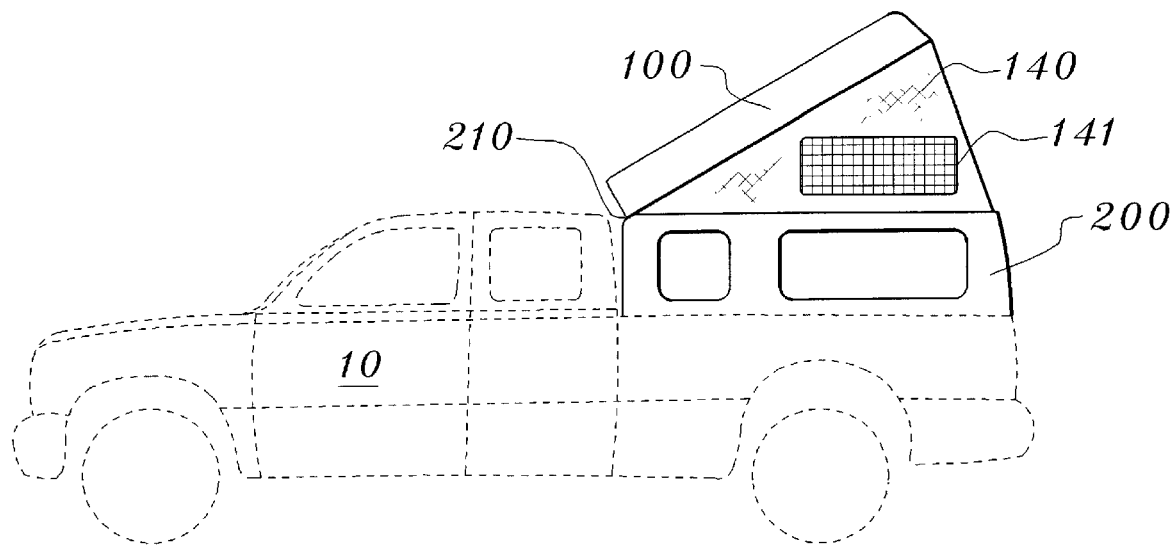
FIG. 2 shows a side view of the two piece camper shell hinged at the front and in open position

FIG. 2 depicts camper attachment 20 with top 100 extended in full open position above shell 200. Top 100 is rotatably engaged to shell 200 at hinge point 210. One method of rotatably engaging roof 100 to shell 200 is by a piano hinge. The preferred embodiment uses a piano hinge because of the greater strength and reliability over separate hinges. However, camper attachment 20 may be constructed using separate and removable hinges so that top 100 can be detached from shell 200 and a utility rack such as a ladder rack can be mounted on shell 200. Fabric 140 is placed in position after top 100 is fully extended. Fabric 140 may have side mounted screen 141. Fabric 140 is attached to top 100 and to shell 200 by button snaps. The term "button snaps" as used herein means a plurality of male snaps fixed to fabric 140 and a plurality of female snaps affixed to top 100 and shell 200. Persons skilled in the art will recognize that the use of male and female snaps can be reversed so that female snaps are affixed to fabric 140 and male snaps are affixed to top 100 and shell 200. The button snaps are not shown. Persons of ordinary skill in the art are familiar with the use of button snaps as well as alternative devices for hooking or affixing various fabrics to another fabric or to a rigid surface. The term "fabric" as used herein, means canvas, nylon, gore-tex or any material suitable for outdoor shelters which is capable of being folded and refolded numerous times without deterioration. When opened as shown in FIG. 2, camper attachment 20 provides a sleeping area. On a short truck, the area will not be sufficient for an adult.

Figure 3:
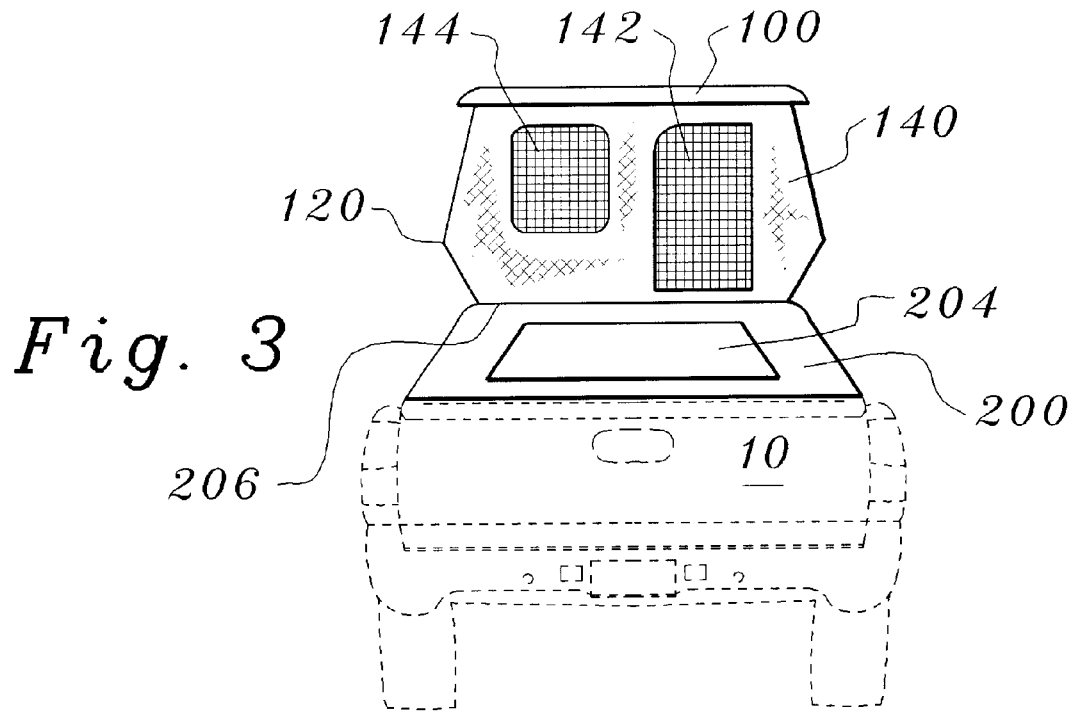
FIG. 3 shows a rear view of the two piece camper shell hinged at the front and in open position

FIG. 3 shows a rear view of the camper attachment 20 where top 20 has been extended from a closed position to an open position. Shell 200 may have rear view window 204. Shell roof 206 is a recessed flat surface which forms the sleeping area when top 100 is open and extended. In order to provide more space inside camper attachment 20, after top 100 is raised, material 150 is extended toward the outside by lifting and engaging spreader bars (not shown) which are hinged to the recessed top surface of shell roof 206 of shell 200. Window 144 and door 142 allow air to flow inside the compartment and may be opened and closed by velcro fasteners, zippers, buttons or male and female snaps.

Figure 4:
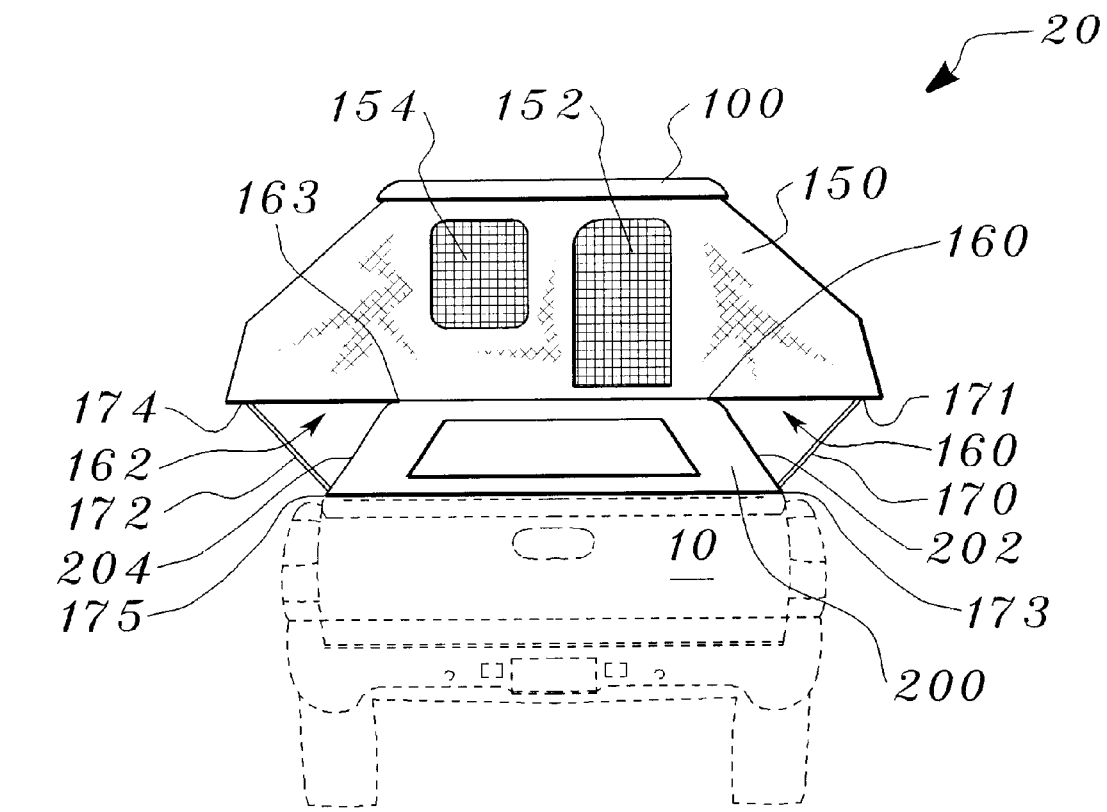
FIG. 4 shows a rear view of the two piece camper shell hinged at the front, in open position and with side extensions deployed.

FIG. 4 shows the two piece camper attachment 20 with top 100 hinged at the front and pulled upward to provide a sleeping area. In FIG. 4, right side extension 160 and left side extension 162 have been rotated from a first position folded flat with the recessed top surface of shell 200 until they are extending out over the sides of shell 200 and truck 10. Right side extension 160 and left side extension 162 are rotatably connected to shell 200 by hinges at right side extension hinge point 161 and left side extension hinge point 163. In the preferred embodiment, piano hinges are used. However, persons of ordinary skill in the art will be familiar with a variety of ways to rotatably connect right side extension 160 and left side extension 162 to shell 200. Right side extension 160 is supported by right rod 170 anchored to shell right side 202 and right side extension bottom 164. Left side extension 162 is supported by left rod 172 anchored to shell left side 204 and right side extension bottom 165. Persons of ordinary skill in the art will be familiar with a variety of ways to removably affix right rod 170 and left rod 172. In the preferred embodiment, right rod 170 and left rod 172 are fixedly and rotatably engaged to the underside of right side extension 160 and left side extension 162 respectively. Right rod 170 and left rod 172 are of metal tubular construction. Right rod 170 has right rod first end 171 and right rod second end 173. Left rod 172 has left rod first end 174 and left rod second end 175. Right rod first end 171 and left rod first end 174 are affixed to the right side extension bottom 164 and left side extension bottom 165 respectively. Right rod first end 171 and left rod first end 172 are flatted and have a hole for receiving a pin. A small mounting (not shown) on the underside of right side extension bottom 164 and left side extension bottom 165 have holes for receiving the pin and for receiving right rod first end 171 and left rod first end 172. The pins when inserted through the mountings and right rod first end 171 and left rod first end 172 rotatably and fixedly engage the rods to right side extension bottom 164 and left side extension bottom 165. Right rod second end 173 and left rod second end 175 are likewise flattened and have holes for receiving a pin. Shell 200 has mount holes (not shown) on the shell right side 202 and shell left side 204 which when lined up with the holes in right rod second end 173 and left rod second end 175 will receive a locking pin that can be inserted, locked and later removed by pressure on a pin release.

Figure 5:
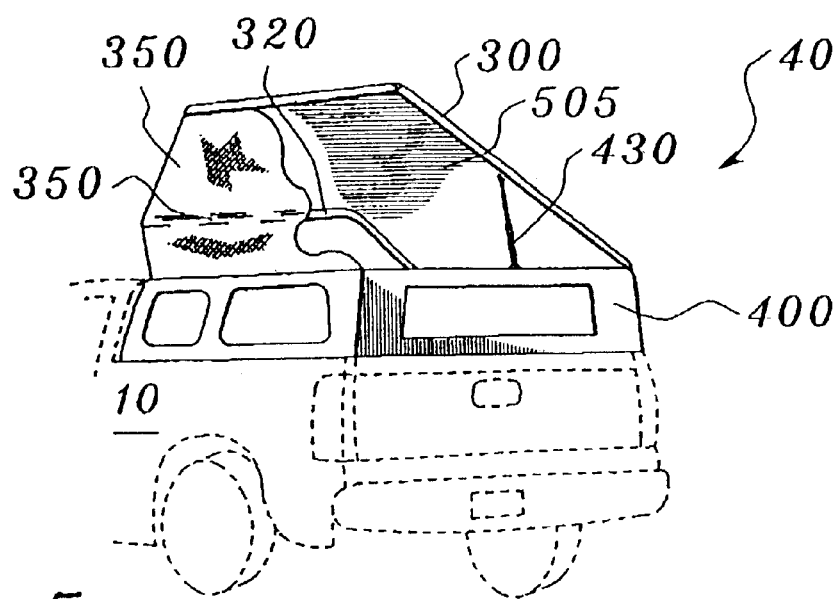
FIG. 5 shows the two piece camper top hinged at the right side with canvas spreader engaged.

FIG. 5 depicts camper attachment 40 with top 300 rotatably attached to shell 400 along the right side of top 300 and shell 400. Alternatively, top 300 could be attached to shell 400 along the left side of top 300 and shell 400. Support for top 300 is provided by piston 430. Fabric 350 is affixed to top 300 and shell 400 to cover the open space and spreader bar 320 is rotated from a first position where it is flat against the top of shell 400 to a second position where it contacts fabric 350 pushing it out and away from shell 400. Spreader bar 320 as depicted in FIG. 5 is typical of the spreader bars referred to in FIGS. 3, 4, and 6. Spreader bar 320 may be made of lightweight flat or tubular metal with flattened ends with hole for connection to a mounting plate (not shown) affixed to shell 400 where a pin is used to connect the flattened ends of spreader bar 320 to the mounting plates. Persons of ordinary skill in the art will know of a variety of other ways of affixing spreader bar 320 to shell 400. Button snaps (not shown) are used to affix fabric 350 to top 300. Once rotated to its second position, spreader bar 320 may be affixed to fabric 350 by means of fabric ties. fabric snap connections or velcro.

Figure 6:
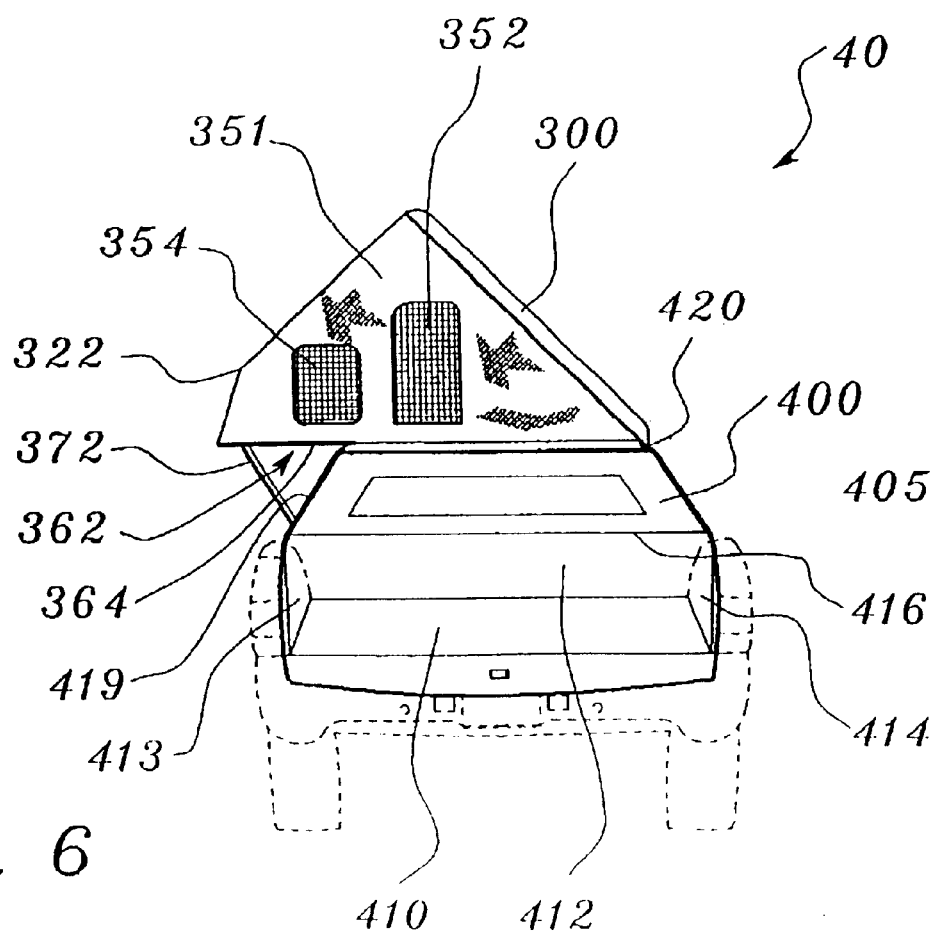
FIG. 6 shows a rear view of the two piece camper shell hinged at the right side, in open position and with side extension deployed.
Figure 10:
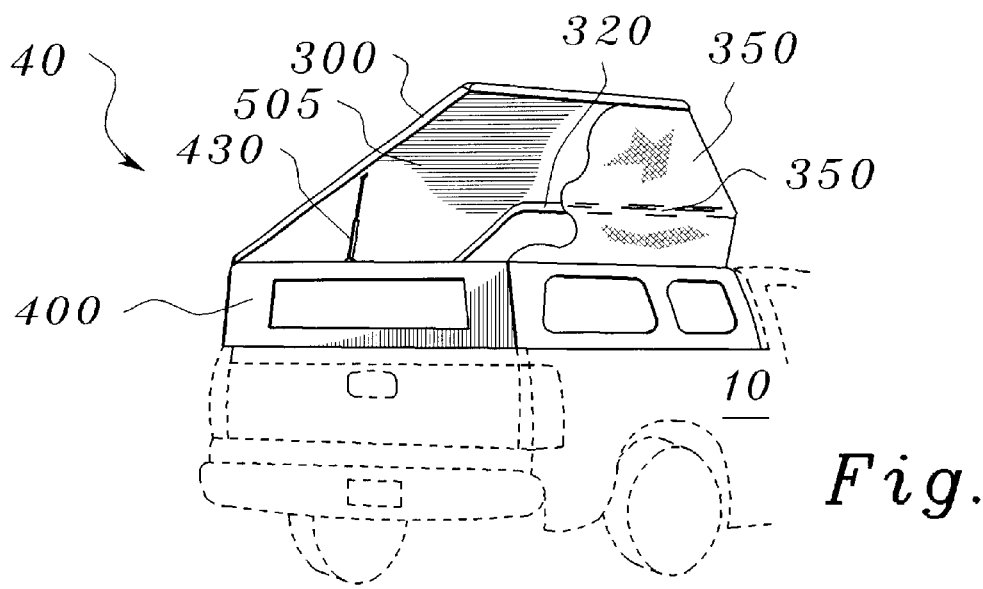
FIG. 10 shows the two piece camper top hinged at the left side with canvas spreader engaged.
Figure 11:
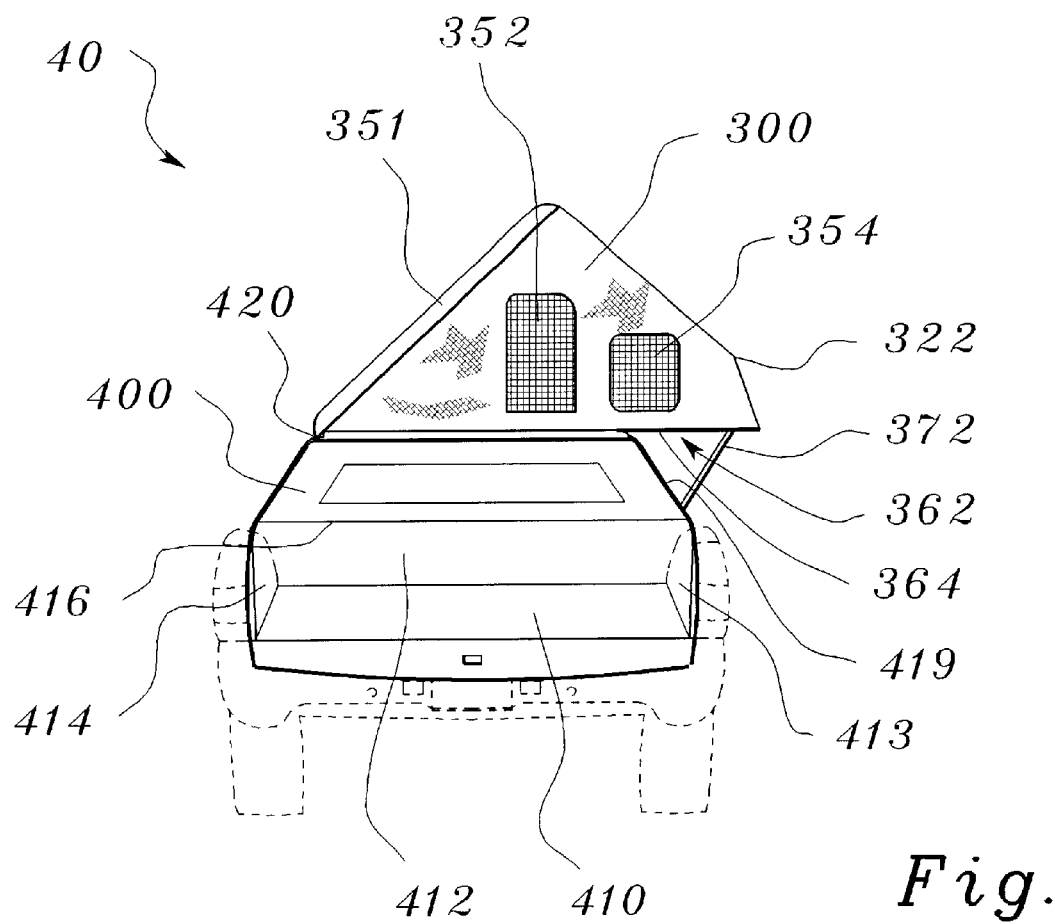
FIG. 11 shows a rear view of the two piece camper shell hinged at the left side, in open position and with side extension deployed.

FIG. 6 is a rear view of top 300 in the open position. Top 300 is rotatably attached to shell 400 by hinge 420. In FIG. 6, left side extension 362 has been folded out from a first position in which left side extension 362 lays flat inside the recessed top surface of shell 400 to a second position in which left side extension 362 extends outward away from roof 400. In the preferred embodiment. left side extension 362 is rotatably connected to shell 400 by means of a piano hinge. However persons of ordinary skill in the art will be familiar with a variety of ways to rotatably connect left side extension 362 to shell 400. Left side extension 362 is supported by left rod 372 which anchors to shell left side 419 and left side extension bottom 364. Left rod 372 is attached to left side extension 362 and shell left side 419 in a manner similar to that described above for left rod 172 in FIG. 4. Fabric 351 is attached to top 300, shell 400 and left side extension 362 by means of button snaps. Spreader bar 320 (shown in FIG. 5) is moved from a first position flat inside the recessed top surface of shell 400 to a second position pressing against fabric 350 so that fabric 350 is pushed out and away from shell 400 to position 322. Fabric 350 is made taught by spreader bar 320 (shown in FIG. 5) and spreader bar 320 is affixed to the inside of fabric 350 by means of ties, snaps or velcro. Window 354 is representative of a screened opening to allow air and light to pass inside the sleeping area created by top 300 and roof 400. Door 352 is representative of a screened opening to allow air and light into the sleeping area as well as a means of entering the sleeping area after fabric 350 has been positioned. While FIG. 5 and FIG. 6 depict top 300 hinged along the right axis of shell 400, it should be understood that the invention will work in the same manner if top 300 is hinged along the left axis of shell 400. FIG. 10 and FIG. 11 depict top 300 hinged along the left axis of shell 400.

In FIG. 6. truck 10 is shown with the tailgate down. The space defined by shell 400, truck bed 410, inside right wall 414, inside left wall 414 and front wall 410 can be packed full and does not need to be disturbed in order to have a sleeping area available due to the area that can be created by top 300 when opened.

FIG. 7 is a detail view of a corner of one embodiment of a shape of roof 300 referred to as contoured roof 370. Molded strips 371 built onto contoured roof top surface 372 add strength to top 370. Contoured roof 370 has contoured roof first right side 377 which meets curve 375. Curve 375 meets contoured roof second right side 373. Structural strength is added to roof 300 by curve 375. Contoured roof rear first side 376 meets contoured roof step 378. Contoured roof step 378 meets contoured roof rear second side 374. The contoured shape adds structural strength.

FIG. 8 is a detail view of an embodiment of the right rear corner of shell 400. Shell right side 408 rises vertically to meet first step 402. First step 402 meets first wall 406 which rises to meet second step 404. Second step 404 ends at top surface 405. First step 402 allows for the edge of top 370 to rest when closed and also to provide a seal. Rain and moisture are kept out when top surface 370 is closed because the edge of top 370 is below top surface 405 of shell 400. Alternatively, shell 400 may be shaped as shown where shell rear side 410 meets shell rear curve 407. Shell rear curve 407 meets top surface 405. Top surface 405 is recessed as shown below in FIG. 9. The double step contour shown in FIG. 8 may be utilized on the front, sides, and back of shell 400 and provides a mounting area for alternate tops such as a ladder rack should top 370 be removed.

FIG. 9 is a detail view of roof 300 attached to shell 400 by hinge 420. In FIG. 9, piston 430 supports roof 300 in the open position. Shell top surface 405 is the sleeping area. Shell top surface 405 is recessed allowing extensions and spreader bars to lie flat when not deployed. Hinge 420 is attached to the inside wall of recessed shell top surface 405. If hinge 420 is detached and top 300 removed, shell 400 can function as an enclosed cargo space. Shell top 405 can be reinforced during construction with wood slats to increase the strength of shell top 405 for supporting weight as a sleeping area.

FIG. 10 depicts camper attachment 40 with top 300 rotatably attached to shell 400 along the left side of top 300 and shell 400. FIG. 11 is a rear view of top 300 in the open position. Top 300 is rotatably attached to shell 400 by hinge 420. In FIG. 11, right side extension 362 has been folded out from a first position in which right side extension 362 lays flat inside the recessed top surface of shell 400 to a second position in which right side extension 362 extends outward away from roof 400.

Figure 12:
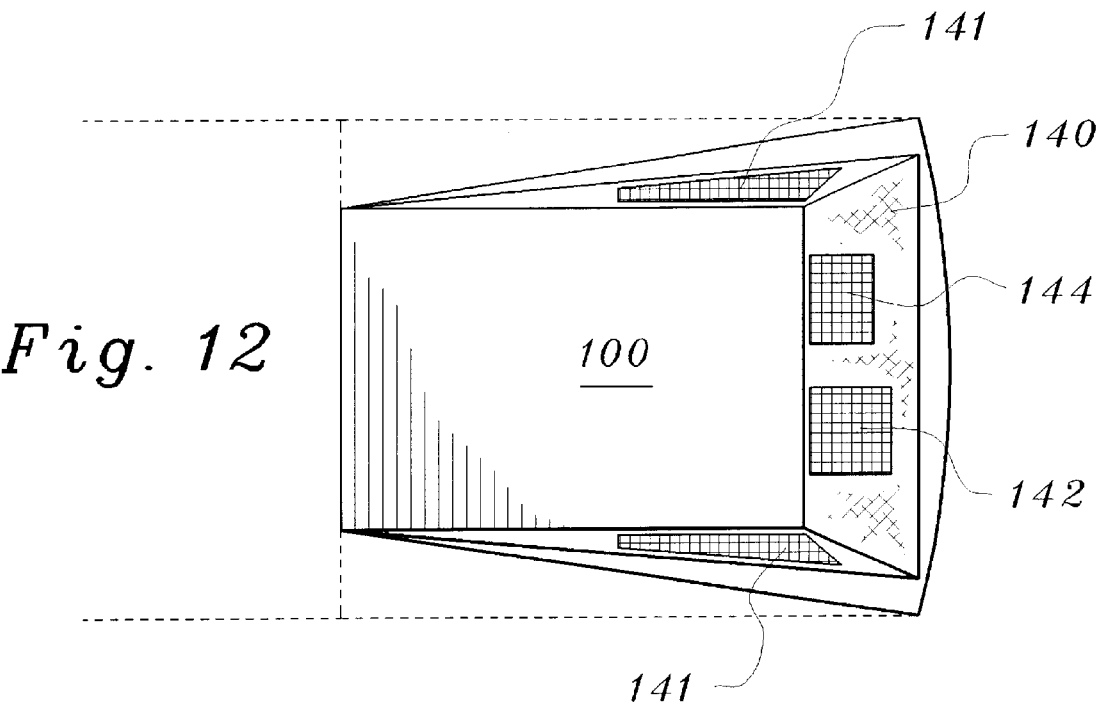
FIG. 12 shows a top view of the two piece camper shell hinged at the front, in open position with canvas spreader engaged.
Figure 13:
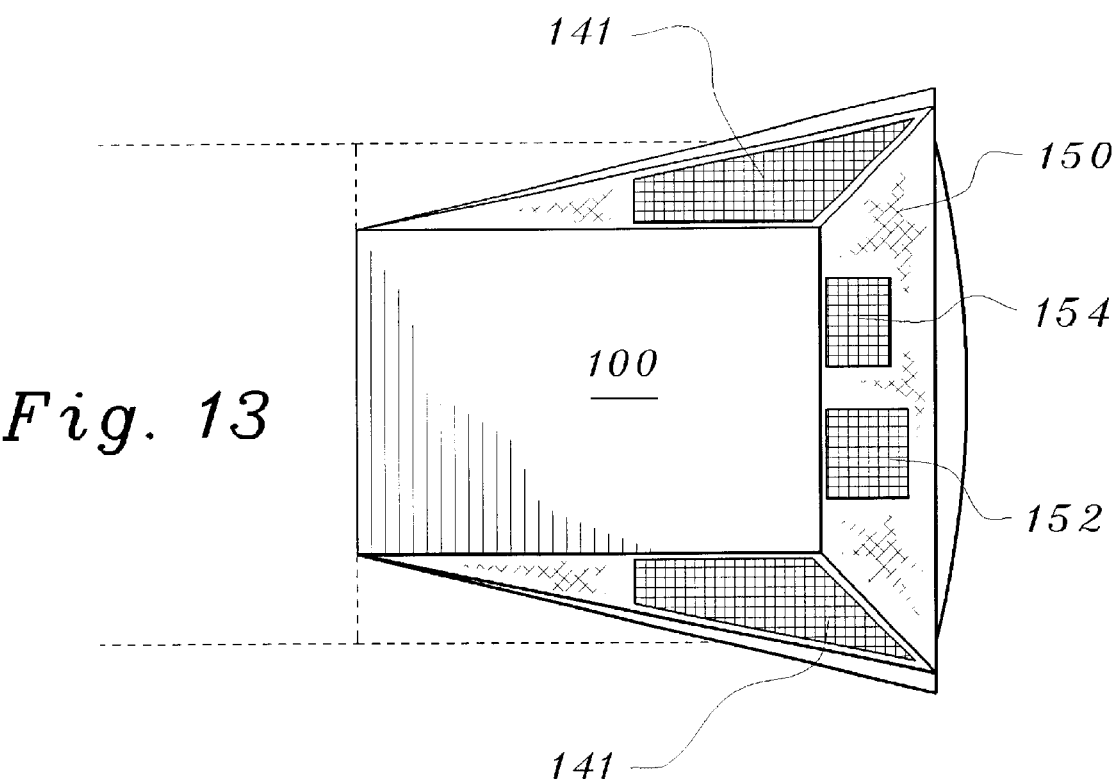
FIG. 13 shows a top view of the two piece camper shell hinged at the front, open position with side extensions deployed and canvas spreader engaged.

FIG. 12 depicts a top view of camper attachment 20 with roof 100 extended in full open position above shell 200 as shown in FIG. 3. FIG. 13 shows a top view of the two piece camper attachment 20 with top 100 hinged at the front and pulled upward to provide a sleeping area as shown in FIG. 3. In FIG. 13 right side extension 160 and left side extension 162 have been rotated from a first position folded flat with the recessed top surface of shell 200 until they are extending out over the sides of shell 200 and truck 10.

Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims. Other alternatives and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

What is claimed:

1. An improved camper attachment for a truck comprising:
   a top;
   a shell adapted for removable engagement to said truck;
   a plurality of top snap receivers on said top:
   a plurality of shell snap receivers on said shell;
   a fabric having a plurality of fabric snaps for mating with the plurality of said top snap receivers and said shell snap receivers;
   wherein said shell has a shell roof having a recessed flat surface;
   wherein said top is rotatably affixed to said shell;
   wherein when said top is rotated from a top first position to a top second position forming an interior angle of less than ninety degrees with said shell, and said fabric snaps are mated with said top snap receivers and said shell snap receivers, said top, said shell and said fabric form a top enclosure having four sides and a floor consisting of said shell roof which top enclosure is separate from a bottom enclosure formed by the shell and the truck so that the bottom enclosure may be left packed while the upper enclosure is used for sleeping;
   wherein said shell roof is reinforced to provide support for a sleeping area in said top enclosure; and
   wherein said top and said fabric may be removed and said shell and said truck continue to provide a bottom enclosure.

2. An improved camper attachment for a truck comprising:
   a top;
   a shell adapted for removable engagement to said truck;
   a left extension rotatably affixed to said shell:
   a right extension rotatably affixed to said shell;
   a plurality of top snap receivers on said top;
   a plurality of shell snap receivers on said shell;
   a plurality of right extension snap receivers on said right extension;
   a plurality of left extension snap receivers on said left extension;
   a fabric having a plurality of fabric snaps for mating with the plurality of said top snap receivers, said left extension receivers, said right extension receivers, and said shell snap receivers;
   wherein said shell has a shell roof having a recessed flat surface;
   wherein said shell roof is reinforced to provide support for a sleeping area in a top enclosure;
   wherein said top is rotatably affixed to said shell along a front axis;
   wherein when said top is rotated from a top first position to a top second position, said left extension is rotated from a left extension first position in said recessed flat surface to a left extension second position, said right extension is rotated from a right extension first position in said recessed flat surface to a right extension second position, and said fabric snaps are mated with said plurality of top snap receivers, said plurality of left extension snap receivers, said plurality of right extension snap receivers, and said plurality of shell snap receivers, said top, said shell, said left extension and said right extension, and said fabric form the top enclosure having four sides and a floor consisting of said shell roof which top enclosure is separate from a bottom enclosure formed by the shell and the truck.

3. An improved camper attachment for a truck comprising:
   a top:
   a shell adapted for removable engagement to said truck:
   an extension rotatably affixed to said shell;
   a plurality of top snap receivers on said top;
   a plurality of shell snap receivers on said shell;
   a plurality of extension snap receivers on said shell;
   a fabric having a plurality of fabric snaps for mating with the plurality of said top snap receivers, said extension snap receivers, and said shell snap receivers;
   wherein said shell has a shell roof having a recessed flat surface,
   wherein said top is rotatably affixed to said shell:
   wherein when said top is rotated from a top first position to a top second position forming an interior angle of less than ninety degrees with said shell, said extension is rotated from an extension first position in said recessed flat surface to a cantilevered extension second position, and said fabric snaps are mated with said top snap receivers, said extension snap receivers and said shell snap receivers, said top, said shell, said extension and said fabric form a top enclosure having four sides and a floor consisting of said shell roof which top enclosure is separate from a bottom enclosure formed by the shell and the truck;

wherein said extension is supported in the cantilevered extension second position by a rod connected to said extension and to said truck; and wherein said shell roof is reinforced to provide support for a sleeping area.

4. The improved camper top of claim 3 further comprising a spreader bar rotatably affixed to said shell wherein said spreader bar may be moved from a first position within said recessed flat surface to a second position in contact with said fabric.

5. The improved camper top of claim 3 further comprising a shell having a double step contour to provide a mounting area for a ladder rack.

* * * * *